United States Patent
Oksman et al.

(10) Patent No.: US 9,407,760 B2
(45) Date of Patent: Aug. 2, 2016

(54) PERFORMANCE MONITORING FOR DISCONTINUOUS OPERATION MODES

(71) Applicant: Lantiq Deutschland GmbH, Neubiberg (DE)

(72) Inventors: Vladimir Oksman, Morganville, NJ (US); Rainer Strobel, Munich (DE)

(73) Assignee: Lantiq Beteiligungs-GmbH & Co.KG, Neubiberg (DE)

( * ) Notice: Subject to any disclaimer, the term of this patent is extended or adjusted under 35 U.S.C. 154(b) by 0 days.

(21) Appl. No.: 14/534,249

(22) Filed: Nov. 6, 2014

(65) Prior Publication Data

US 2015/0124943 A1    May 7, 2015

Related U.S. Application Data

(60) Provisional application No. 61/900,497, filed on Nov. 6, 2013.

(51) Int. Cl.

| | | |
|---|---|---|
| *H04M 1/24* | (2006.01) | |
| *H04M 3/08* | (2006.01) | |
| *H04M 3/22* | (2006.01) | |
| *H04M 3/34* | (2006.01) | |
| *H04M 3/30* | (2006.01) | |
| *H04M 11/06* | (2006.01) | |

(52) U.S. Cl.
CPC .............. *H04M 3/34* (2013.01); *H04M 3/2209* (2013.01); *H04M 3/302* (2013.01); *H04M 11/062* (2013.01)

(58) Field of Classification Search
CPC . H04M 11/062; H04M 3/2209; H04M 3/302; H04M 3/34; H04L 27/0002; H04L 27/30; H04L 5/0098; H04L 5/14; H04L 3/32; H04L 27/2602; H04L 5/1469; H04L 11/062
USPC .......... 379/1.01, 1.03, 1.04, 22.08, 24, 27.08, 379/32.01, 32.04, 9, 10.01, 15.01; 375/222, 375/227, 254, 295, 316
See application file for complete search history.

(56) References Cited

U.S. PATENT DOCUMENTS

| | | | | |
|---|---|---|---|---|
| 8,559,547 | B2 * | 10/2013 | Nuzman | H04M 3/18 370/201 |
| 8,982,934 | B2 * | 3/2015 | Gupta | 375/222 |

(Continued)

FOREIGN PATENT DOCUMENTS

WO      2013064096 A1     5/2013

OTHER PUBLICATIONS

BT: "G.fast: Low Power Modes—Continued; TD2013-03-Q4-067", ITU-T Draft; Study Period 2013-2016, International Telecommunication Union, Geneva; CH, vol. 4a/15, May 10, 2013, pp. 1-8.
G. Ginis; J.M. Cioffi: "Vectored transmission for digital subscriber line systems", Selected Areas in Communications, IEEE Journal, vol. 20, No. 5, Jun. 2002, pp. 1085-1104.

(Continued)

*Primary Examiner* — Binh Tieu

(57) ABSTRACT

Methods and apparatuses are provided wherein performance of lines configured for discontinuous operation is monitored on symbols transmitted using a base configuration in which the lines are active. On the basis of the monitored performance, performance may be calculated for other configurations in which one or more of the lines are discontinued.

22 Claims, 7 Drawing Sheets

(56) References Cited

U.S. PATENT DOCUMENTS

| | | | |
|---|---|---|---|
| 2009/0175156 A1* | 7/2009 | Xu | H04B 3/32 370/201 |
| 2013/0107917 A1* | 5/2013 | Gupta | 375/219 |
| 2013/0272177 A1* | 10/2013 | Wei et al. | 370/294 |
| 2014/0105262 A1* | 4/2014 | Alloin | H04B 3/46 375/222 |
| 2014/0254791 A1* | 9/2014 | Wei et al. | 379/406.01 |

OTHER PUBLICATIONS

"Self-FEXT cancellation (Vectoring) for use with VDSL2 transceivers; G.993.5 (2010) Amendment 4 (08/13)", ITU-T Standard, International Telecommunication Union, Geneva; CH, No. G993.5 (2010) Amendment 4 (08/13), Aug. 29, 2013, pp. 1-18.

European Search Report for parallel EP application 14 192 080.1 of Nov. 6, 2014.

* cited by examiner

| Type | Symbols | Configuration |
|---|---|---|
| Symbols transmitted with full power on all lines | Sync symbols | Bitloading 4QAM for all, gains same as for data |
| Symbols transmitted on all lines, but on L2 lines with different bits / gains | Some RMC symbols | L2 bits / gains for L2 lines, high performance bits / gains for other lines |
| Symbols transmitted on all L0 lines only | Some RMC symbols / all data before demarcation line | High performance bits / gains (reference configuration) |
| Symbols transmitted on some lines | Data after demarcation line | DO bits / gains |

Fig. 4

PERFORMANCE MONITORING FOR DISCONTINUOUS OPERATION MODES

The present application relates to methods for performance monitoring in a data transmission system and to corresponding apparatuses.

BACKGROUND

Digital Subscriber Line (DSL) technology using copper loops, e.g., including ADSL, ADSL2, (S)HDSL, VDSL, VDSL2, and the upcoming G.fast, during all its history, attempted to increase the bit rate in the aim to deliver more broadband services to the customer. Since copper loops deployed from a Central Office (CO) to a customer premises equipment (CPE) are typically rather long and do not allow transmission of data with bit rates more than few Mb/s, modern access networks use street cabinets, MDU-cabinets, and similar arrangements, also referred to as distribution points (DP): the cabinet or other DP is connected to the CO by a high-speed fiber communication line, e.g., gigabit passive optical network (GPON) and installed close to the customer premises. From these cabinets, high-speed DSL systems, such as Very-High-Bit-Rate DSL (VDSL), provide connection to the CPE. The currently deployed VDSL systems (ITU-T Recommendation G.993.2) have range of about 1 km, providing bit rates in the range of tens of Mb/s. To increase the bit rate of VDSL systems deployed from the cabinet, the recent ITU-T Recommendation G.993.5 defined vectored transmission that allows increasing upstream and downstream bit rates up to 100 Mb/s. Vectoring will also be used in upcoming G.fast.

Recent trends in the access communications market show that data rates up to 100 Mb/s which are provided by VDSL systems using Vectoring as defined in ITU-T Recommendation G.993.5 are not sufficient and bit rates up to 1.0 Gb/s are required.

To achieve these targets, copper loops connecting the CPE must be as short as 50-100 m. Operation using such short loops requires installation of many small DPs, e.g, in the form of street/MDU cabinets, that serve a very small number of customers, e.g., 16 or 24, and are connected to the backbone via fiber. Such access scenarios are also referred to as FTTdp (fiber to the distribution point).

As for example described by G. Ginis and J. M. Cioffi, "Vectored transmission for digital subscriber line systems", Selected Areas in Communications, IEEE Journal on, 20(5), pp. 1085-1104 (2002), vectoring may be used in systems operating from a DP, to reduce far-end crosstalk (FEXT) and obtain high bit rates. To improve energy efficiency and to and reduce hardware complexity, synchronized time division duplexing (STDD) may be used for FTTdp instead of frequency division duplexing (FDD) as typically used in VDSL.

The DPs shall allow very flexible installation practices: For example, they should be light and easy to install on a pole or house wall, or in a basement, without air-conditioning. The most challenging issue for these flexible connection plans is providing DPs with power. Here, one solution is so-called "reverse feeding" where the equipment of the DP is fed by the connected customer. The requirement of reverse power feeding and the small size of the DP may imply substantial restrictions on the power consumption of the DP.

The main contributors to the power consumption of the DP are DSL transceivers. Further, in many cases also battery-powered operation of the CPE is required, e.g., to support life line POTS (Plain Old Telephone System) during power outages. The latter implies low power requirements also for DSL transceivers of the CPE equipment.

To support power efficient operation, a method of power saving called "discontinuous operation" may be used.

Conventional DSL systems transmit data continuously on all lines sharing the cable binder. Whenever there is no data available, idle bytes are transmitted. With this type of static operation, the system stability and performance is maintained. Link quality measures like signal-to-noise-ratio (SNR) or bit error rate (BER) change only slowly over time. Therefore, they can be measured by averaging over a long time period.

In FTTdp applications, the transmit power is only a small portion of the overall power consumption, because the aggregate transmit power is in the range of 4 dBm. Components like the analog front-end (AFE) and digital front-end (DFE) electronics consume power irrespective of the transmit power, and may significantly contribute to the overall power consumption, because they operate at much higher frequencies of typically 100 MHz or 200 MHz in comparison to 8 MHz-30 MHz in VDSL.

In order to provide significant power savings in discontinuous operation, also analog and digital components of the transceiver, such as AFE and DFE may be switched into low-power (standby) state, as for example described by L. Humphrey and I. Horsley, "G.fast: Discontinuous Operation", Contribution ITU-T SG15/Q4a 11BM-035 (2011).

In currently operated systems using Vectoring, such as specified in ITU-T Rec. G.993.5-2010. Self-FEXT CANCELLATION(Vectoring) for Use with VDSL2 Transceivers (2010), a time consuming procedure called "orderly leaving" is required before a link can be switched off. If a line is disconnected without orderly leaving, the remaining active lines of the binder may experience substantial performance drops. Therefore, AFE and DFE cannot be turned off for short time which substantially reduces possible power savings by discontinuous operation.

Due to the fast changes of the link quality which are caused by discontinuous operation, the SNR measurement as it is implemented in conventional DSL technology may deliver incorrect results and lead to a wrong estimation of the link rate. When the data rates are over-estimated, this may cause bit errors during transmission. When the data rates are underestimated, the actual data rate is unnecessarily reduced.

Accordingly, there is a need for technologies which allow for efficient performance monitoring, e.g., for link quality monitoring for low power modes, such as low power modes involving discontinuous operation of lines of a data transmission system.

BRIEF DESCRIPTION OF THE DRAWINGS

FIG. 4 shows a table for illustrating exemplary configurations which may be utilized according to an embodiment.

DETAILED DESCRIPTION

Embodiments will be described in the following in detail with reference to the attached drawings. It should be noted that these embodiments serve as illustrative examples only and are not to be construed as limiting. For example, while embodiments may be described having numerous details, features or elements, in other embodiments some of these details, features or elements may be omitted and/or may be replaced by alternative features or elements. In other embodiments, additionally or alternatively further features, details or elements apart from the ones explicitly described may be provided.

Communication connections discussed in the following may be direct connections or indirect connections, i.e., connections with or without additional intervening elements, as long as the general function of the connection, for example to transmit a certain kind of signal, is preserved. Connections may be wireless connections or wire-based connections unless noted otherwise.

To maintain link stability for systems applying discontinuous operation, specific link quality monitoring methods may be required. Such methods and corresponding apparatuses are provided by embodiments described in the following. The methods and apparatuses may be used to keep stability and performance during active data transmission, while the channel and noise conditions change over time.

In data transmission systems as considered in the illustrated embodiments, the SNR per subcarrier may be regarded as the most important link quality measure. For example, it may be used to set the number of bits to be modulated on a specific subcarrier. The SNR may be continuously monitored, and in case that it increases or reduces, the data rates may be adapted accordingly.

The SNR may be defined as the ratio between signal and noise power, which both may be measured by averaging over many symbols. With the introduction of discontinuous operation, existing methods of monitoring the SNR or similar performance measures may no longer applicable, as the signal power as well as the noise may change on a per-symbol basis. Accordingly, in embodiments as explained in the following, a base configuration of active lines is used for performance monitoring, and the SNR or other performance measures are based on monitoring a set of symbols which exclusively consists of symbols transmitted using the base configuration. Performance of other configurations, in which for example one or more of the lines are discontinued, may be calculated on the basis of the monitoring in the base configuration.

Figure 1:
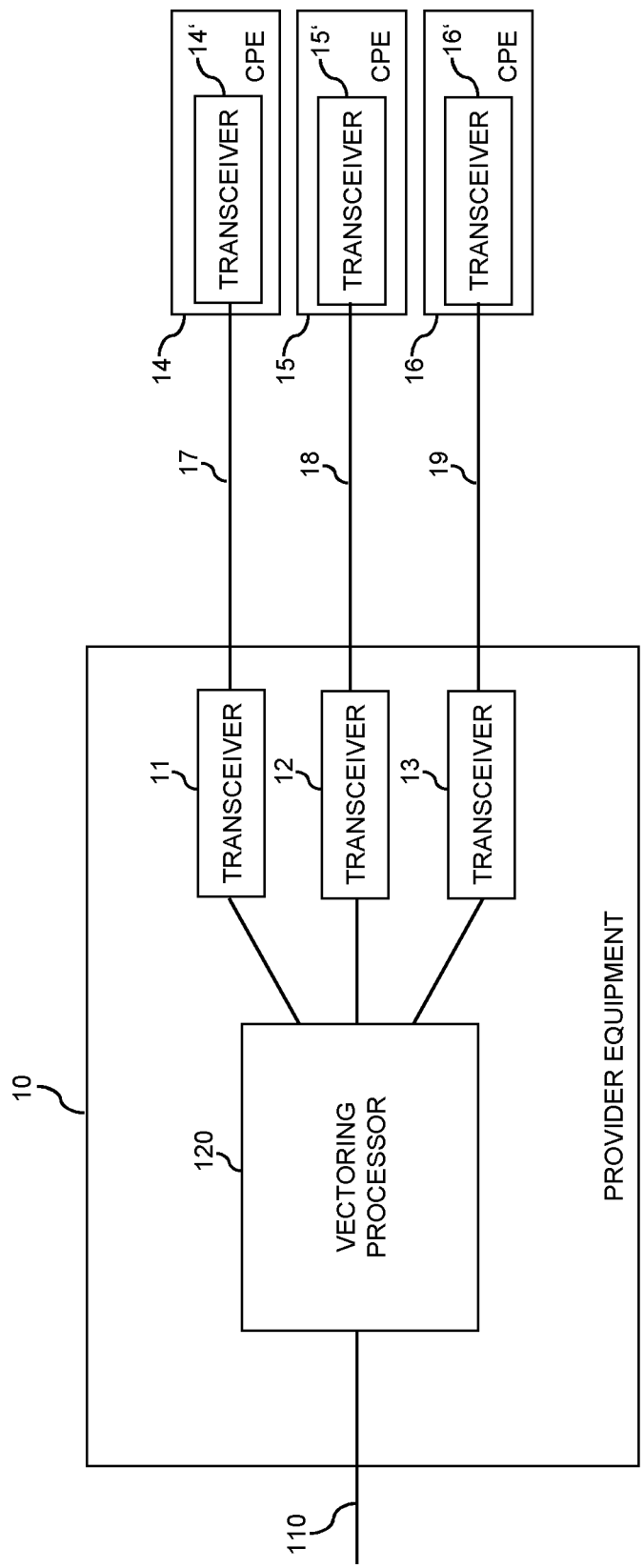
FIG. 1 is a block diagram illustrating a data transmission system according to an embodiment.

Turning now to the figures, in FIG. 1 a data transmission system according to an embodiment is shown. The system of FIG. 1 includes a provider equipment 10 communicating with a plurality of CPE units 14-16. While three CPE units 14-16 are shown in FIG. 1, this serves merely as an example, and any number of CPE units may be provided. Provider equipment 10 may be correspond to a DP, e.g., of a FTTdp system. In case provider equipment 10 is part of a distribution point, it may for example receive and send data from and to a network via a fiber optic connection 110. In other embodiments, other kinds of connections may be used.

In the embodiment of FIG. 1, provider equipment 10 comprises a plurality of transceivers 11-13 to communicate with CPE units 14-16 via respective communication connections 17-19. In each of the CPE units 14, 15, 16, a corresponding transceiver 14', 15', 16' is provided to communicate via the respective communication connection 14-16. Communication connections 17-19 may for example be copper lines, e.g. twisted pairs of copper lines. Communication via communication connections 17-19 may be communication based on a multicarrier modulation like discrete multitone modulation (DMT) and/or orthogonal frequency division multiplexing (OFDM), for example an xDSL communication like ADSL, VDSL, VDSL2, G.Fast etc., i.e., communication where data is modulated on a plurality of carriers, also referred to as tones. In some embodiments, the communication system may use vectoring. The vectoring may be performed by a vectoring processor, as indicated by a block 120 in FIG. 1. Vectoring comprises joint processing of signals to be sent and/or received to reduce crosstalk.

A communication direction from provider equipment 10 to CPE units 14-16 is herein also referred to as downstream direction, and a communication direction from CPE units 14-16 is herein also referred to as upstream direction. Vectoring in the downstream direction is also referred to as crosstalk pre-compensation, whereas vectoring in the upstream direction is also referred to as crosstalk cancellation or equalization.

Provider equipment 10 and/or CPE units 14-16 may include further communication circuits (not shown) conventionally employed in data transmission systems, for example circuitry for modulating, bit loading, Fourier transformation, or the like.

In the illustrated embodiments, communication via communication connections 17-19 may be frame-based. A plurality of frames may form a superframe. The frames may be based on time division multiplexing (TDD), in particular STDD, such as used in DP vectored transceivers, e.g., based on the G.fast technology.

In case of STDD, each line has assigned time allocation for upstream and downstream transmission time slots (TTS for US and DS) separated by a guard time. Further, downstream TTS of all vectored lines are aligned and upstream TTS of all lines are aligned. There is a guard time set between upstream and downstream transmissions.

Figure 2:
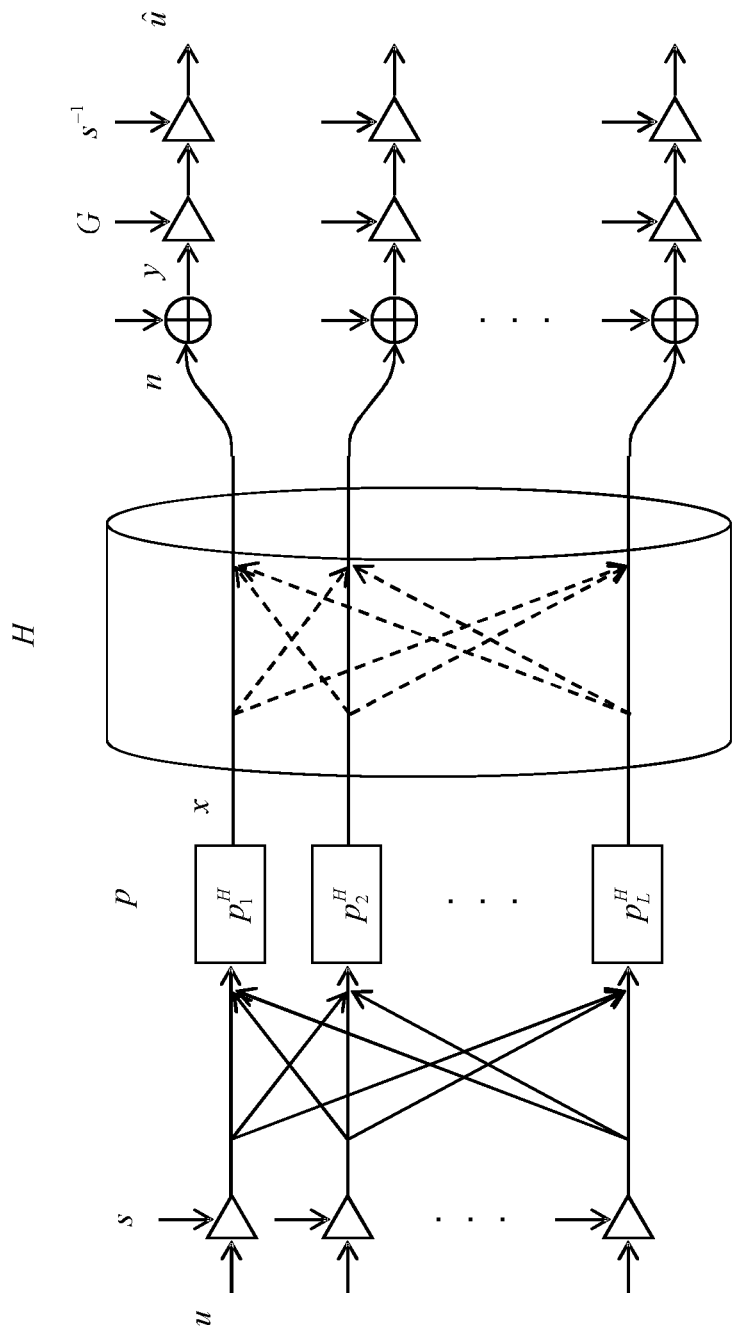
FIG. 2 illustrates a system model for a downstream transmission direction as utilized in an embodiment.

For performance monitoring, the downstream direction may be regarded as being more critical, because the performance measures like SNR and bit errors are collected at the CPE and must be transmitted to the DP. A system model for the downstream direction is shown in FIG. 2.

The transmit signal of the data streams for individual users are collected in a transmit signal vector u. For a multicarrier system, the model from FIG. 3 applies for each of the multiple subcarriers. The transmit spectrum for each line is shaped using the scale coefficients s, which are collected in a diagonal scale matrix S. The shaped signals are jointly precoded using a linear matrix P and then transmitted over the crosstalk channel, denoted as H. The individual receivers at the CPEs experience additive white Gaussian noise n. The CPEs independently decode the signals with one coefficient g per line and subcarrier. The equalizer coefficients are collected in a diagonal matrix G. The receive signal vector û is then given by $$\hat{u} = S^{-1} G (HPSu + n). \tag{1}$$

Figure 3:
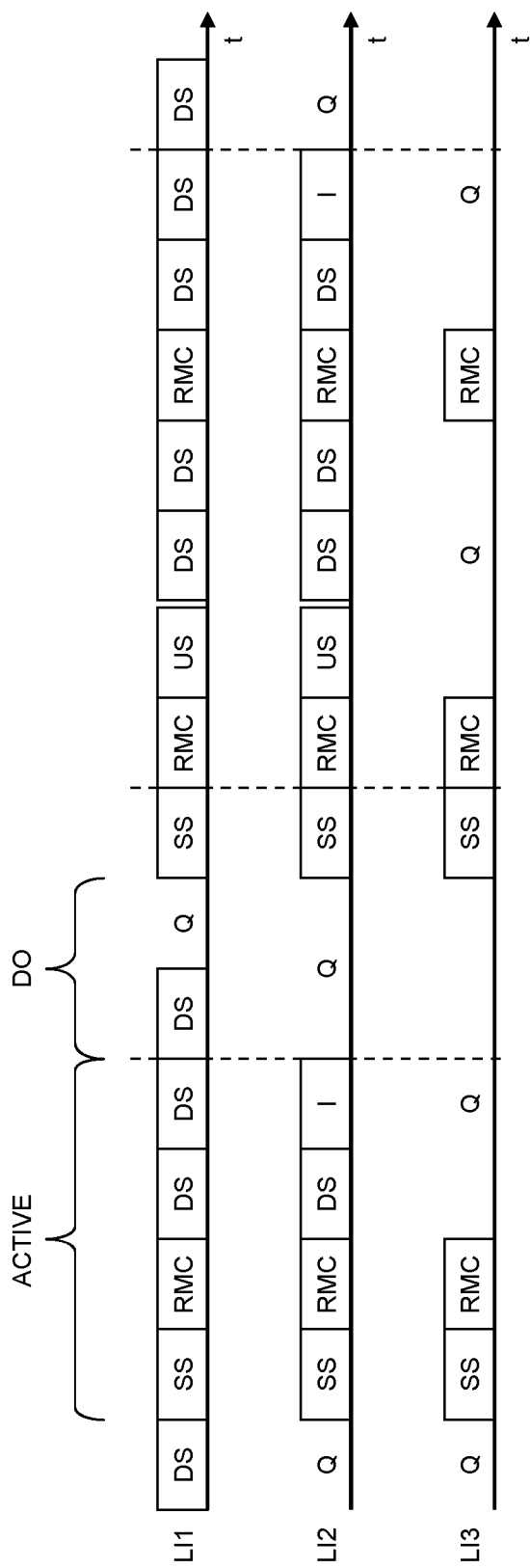
FIG. 3 illustrates an exemplary frame format which may be utilized according to an embodiment.

FIG. 3 shows an example of a frame format of a system using discontinuous operation, which may be utilized in the illustrated embodiments. In the example of FIG. 3, exemplary frames are illustrated for three different lines of the data transmission system, referred to as LI1, LI2, and LI3. It is to be understood, that for each of such lines corresponding transceivers are provided in the DP and in the CPE. The illustrated example assumes an STDD structure of the frames, with downstream symbols (referred to as DS) for the downstream transmission direction and upstream symbols (referred to as US) for the upstream direction being separated in the time domain. As further illustrated, the frames include synchronization or "sync" symbols (referred to as SS) and robust management channel symbols (referred to as RMC).

For lines configured for discontinuous operation, at least two different configurations may be used: one configuration where all lines are active and one configuration where transmitters and receivers of one or more lines can be switched off (discontinued), which typically requires changes in the bit rates and transmit gains. Such configurations with discontinued lines will in the following also be referred to as discontinuous operation configuration. Some implementations may use more than one discontinuous operation configuration. Each of such multiple discontinuous operation configurations may utilize corresponding bit loading and gain tables to implement discontinuous operation.

Furthermore, a deep low power mode is provided, in which only very low data rates, e.g., for voice-over-IP (VOIP) service, are provided. These lines are in a quiet phase for all symbols except the synchronization symbols (SS) and may send some of the robust management channel symbols (RMC) with additional data to provide the voice-over-IP service. In the example of FIG. 3, the line LI3 is in deep low power mode and carries exclusively synchronization symbols and RMC symbols. The lines LI1 and LI2 are utilized in discontinuous operation and may be switched between active phases, in data symbols (DS and US) are transmitted, and discontinuous operation (DO) phases in which the lines are quiet at some symbol positions of the frame.

A base configuration of all lines active is used to measure the SNR. The base configuration does not include the lines in deep low power mode. FIG. 4 shows a table which lists exemplary combinations of active and inactive (or discontinued) lines which may occur with this frame format.

Further, it is assumed that there is a "reference configuration", which shall provide sufficient performance for all required services. The reference configuration may be used for coefficient computation and for computation of the reference SNR and bit loading. The reference configuration may also be used to transmit data in the active downstream and upstream sections.

It should be noted that the synchronization symbols are not transmitted using the base configuration, but using an extended configuration, where the low power mode lines are also included.

If one line stops downstream transmission and the transmitter is switched off, as it is needed to save power in discontinuous operation, the coefficients of the precoder matrix P may need to be updated to keep the crosstalk cancelation working. If the lines are divided into a group of active lines $I_a$ and a group of discontinued lines $I_d$, the precoder matrix can be arranged into four block matrices as $$P = \begin{bmatrix} P_{aa} & P_{ad} \\ P_{da} & P_{dd} \end{bmatrix}. \quad (2)$$

without loss of generality. The matrix $P_{aa}$ describes precoding coefficients from active lines to active lines, the matrix $P_{ad}$ describes precoding coefficients from discontinued into active lines, the matrix $P_{da}$ describes precoding coefficients from active lines to discontinued lines, and the matrix $P_{dd}$ describes precoding coefficients from discontinued lines to discontinued lines. Assuming that Eq. (2) is the full matrix which cancels crosstalk for the case of all lines being active, a reduced precoder matrix $P_{aa\_DO}$ is given by $$P_{aa\_DO} = P_{aa} - P_{ad} P_{dd}^{-1} P_{da}. \quad (3)$$

When Eq. (3) is used for coefficient correction, the effective H·P does not change for the active lines when discontinuous operation is applied to some other lines. However, the transmit power on these lines may change, which requires to change the values of the scale matrix S for discontinuous operation.

Therefore, in the downstream direction a SNR change ΔSNR is defined by the change of the gain scaling matrix according to $$\Delta SNR = \frac{SNR_{DO}}{SNR_{active}} = \frac{|s_{DO}|^2}{|s_{active}|^2}. \quad (4)$$

For cases where approximations of the coefficient correction are used, the SNR change ΔSNR may be different from Eq. (4) due to residual crosstalk.

Measurement of the SNR on the base configuration of active lines, referred to as $SNR_{active}$, may be performed at the CPE side. To allow doing the SNR measurement by averaging over many symbols, only a set of symbols which are sent in the base configuration may be used for the SNR measurement. That is to say, symbols sent in other configurations may be excluded from the SNR measurement.

A receiver error vector e may be defined as the difference between transmitted and received signal:

$$e = \hat{u} - u. \quad (5)$$

The SNR on line i may then be calculated by averaging over T symbols according to:

$$SNR_i = \frac{\sum_{t=1}^{T} |u_i^{[t]}|^2}{\sum_{t=1}^{T} |e_i^{[t]}|^2}, \quad (6)$$

where t is a time index of the symbols utilized for calculation of the SNR.

For active lines, the SNR measurement is done with the base configuration, while the SNR margin required for discontinuous operation is computed using Eq. 4. For systems using approximated coefficient correction, an additional frequency-dependent margin or virtual noise may be applied to maintain stability.

In some cases, idle symbols may be modulated with zero power, which means that the SNR averaging according to Eq. (6) may not calculate the signal power correctly. In this case, it can be assumed that the transmit signal u is scaled to identity power, and the SNR estimation may be performed using only the error power according to $$SNR_i = \frac{T}{\sum_{t=1}^{T} |e_i^{[t]}|^2}. \quad (7)$$

If the signal u is scaled to an average power different from one, the scaling value in the numerator of Eq. (7) may be selected accordingly.

The SNR monitoring for lines in low power mode may be performed by averaging over the RMC symbols which contain the subcarriers for low power mode symbols. Here, only subcarriers with low crosstalk may be used for data transmission in low power mode, such that it is not necessary to change the corresponding gain scaling matrix S between active data symbols and RMC symbols carrying low power mode data.

Crosstalk channel estimation on synchronization symbols may still be performed on all lines, to keep the channel estimation also for lines in low power mode. Accordingly, a PSD change on the synchronization symbols should be avoided. This can be achieved by different methods.

One method is to modulate only low crosstalk subcarriers of the synchronization symbols of the lines in low power mode, where the PSD change is negligible. In this case, the channel estimation needs to be updated when the line switches from low power mode into performance mode, which may increase the time for switching to full performance.

For cases where such delay is not acceptable, the channel estimation may be updated on all lines. In normal operation, the synchronization symbols may be precoded in the same way as the data symbols to guarantee that these symbols are transmitted with the same PSD and to implement adaptive precoding, e.g., with an LMS update for the precoder coefficients.

However, the precoding may change the PSD and may cause PSD violations. If such PSD violations cannot be ignored, they can be avoided either by precoding only the lines which are in active data transmission as shown in $$P_{sync} = \begin{bmatrix} P_{aa} & P_{ad} & 0 \\ P_{da} & P_{dd} & 0 \\ 0 & 0 & I \end{bmatrix}, \quad (8)$$

or by precoding all lines, including the lines in low power mode, but using an orthogonal sequence where the channel estimation is divided into two groups, one containing the active lines and another one containing the lines in low power mode. This can be done a using 3-state orthogonal sequence, such that the lines in low power mode do not influence the PSD of the active lines in the synchronization symbols. By way of example, in a scenario with line 1-4 in active mode and line 5 and 6 in low power mode, the code matrix could be defined as $$U = \begin{bmatrix} +1 & +1 & +1 & +1 & 0 & 0 \\ +1 & -1 & +1 & -1 & 0 & 0 \\ +1 & +1 & -1 & -1 & 0 & 0 \\ +1 & -1 & -1 & +1 & 0 & 0 \\ 0 & 0 & 0 & 0 & +1 & +1 \\ 0 & 0 & 0 & 0 & +1 & -1 \end{bmatrix}. \quad (9)$$

In the upstream direction, the issue of performance monitoring may be regarded as being less critical, as the performance information does not need to be communicated from the CPE to the DP. It may be measured and processed at the DP side. But also for this case, performance monitoring is only done on symbols transmitted with the base configuration.

In the upstream direction, the SNR estimation of discontinuous operation symbols using the base configuration SNR may be performed in a different way than explained above for the downstream direction. In the upstream direction, crosstalk cancelation may be performed by a dense matrix G, without performing vector precoding, e.g., according to $$G_{aa\,DO} = G_{aa} - G_{ad} \cdot G_{dd}^{-1} \cdot G_{da}. \quad (10)$$

In the upstream direction, the receiver noise may be correlated and the crosstalk canceller matrix G may allow residual crosstalk when it is optimized with respect to the minimum mean squared error. But for the common case that the receiver noise is uncorrelated and of equal strength for all lines, the SNR in discontinuous operation is given by $$\Delta SNR_i = \frac{SNR_{DO}}{SNR_{active}} \quad (11)$$

$$= \frac{g_{aai}^T g_{aai}^*}{g_{aaiDO}^T g_{aaiDO}^*}$$

where $g_i^T$ is the i-th row of the canceller matrix G.

To facilitate monitoring of performance for a specific configuration of active and inactive (i.e., discontinued) lines, which is different from the base configuration, an additional SNR measurement command may be introduced.

For example, the DP may communicate to the CPE some specific symbol indices in the TDD frame or in the superframe, for which the SNR averaging is performed. This additional SNR measurement may be limited to a specific set of subcarriers and a specific number of frames. After measuring the SNR over the requested time, it is communicated from the CPE to the DP to identify potential performance degradation of a specific configuration.

One special configuration which may be measured is the case that all lines in the binder are discontinued. The noise power which is measured in this configuration is equal to the quiet line noise $QLN = E[|n|^2]$, which can be used to estimate residual crosstalk XTN according to $$\frac{1}{SNR} = QLN + XTN \Rightarrow XTN \quad (12)$$

$$= \frac{1}{SNR} - QLN.$$

As the averaging on a small set of symbols of the frame may require long time, additional fast performance monitoring based on error rates and forward error correction (FEC) may be utilized. FEC may be performed on code blocks, where each code block contains additional redundancy to identify uncorrected errors. For example, the identification of the uncorrected errors may be based on a Cyclic Redundancy Check (CRC). Information on the number of symbols with a CRC error can be requested from the CPE. The same holds for information about corrected errors of FEC, which may also be counted at the CPE side.

For systems using discontinuous operation, the information about CRC errors and FEC errors may be extended by information about the position of the error within the TDD frame or superframe. Using this information, the configuration of active lines in which the error occurred may be identified. This may help to identify critical configurations. When the critical configurations are known, they can be avoided by introducing idle symbols, or the bit loading can be reduced or other coding and modulation parameters can be adapted to increase stability.

It should be noted that in some cases interleaving may be applied, or a code block may be spread over multiple data symbols which are transmitted using different configurations. In such case, the information about the error position may constitute an approximation for the actual error position.

In the following, methods will be further explained which may be used to improve measurement precision.

In general, it is possible to transmit idle symbols with reduced or even with zero power. However, in case that residual crosstalk is not negligible, this may cause variations in the crosstalk strength which reduce the SNR measurement precision. Therefore, it may be beneficial to send idle symbols with the same power as other data symbols during SNR measurement.

A further way of improving measurement precision is to take into account the number of symbols used for SNR measurement. For example, Eq. (6) shows that SNR measurement is based on averaging over T symbols. Due to the fact that SNR changes over time, it is beneficial to have many symbols per TDD frame that can be used for SNR measurement. Therefore a protocol may be utilized which allows to increase the number of symbols transmitted with the base configuration temporarily, to thereby allow for fast SNR measurement. This may be achieved by indicating in the protocol a parameter which defines a minimum number of symbols to be transmitted using the base configuration. If this minimum number is higher than the number of symbols for which utilization of the base configuration is actually required for transmission of data, idle symbols may be transmitted on those line which would otherwise be discontinued.

To take into account that the transmission channel typically changes over time, the precoder matrix P as well as the equalizers G may be implemented on the basis of adaptive filters to follow the changes in noise and channel conditions. Therefore, the transmit PSDs, which can be modified by the scale matrix S, may need to be changed over time to maintain performance and avoid violations of transmit power and spectral mask limits. This can be done by an adaptive transmit PSD optimization algorithm, which changes the transmit PSDs in small steps to follow small changes of the channel and noise environment. Various methods may be used to calculate initial gain values S for the power allocation.

In typical scenarios, the transmit power in a wired communication system, such as the data transmission system of the illustrated embodiments, is limited by a spectral limit mask or a per-line sum-power limit. In many cases, both limitations are used at the same time. The transmit power at the precoder output for one subcarrier (k) and line v may be given by $$p_{txv}^{(k)} = \sum_{d=1}^{L} |p_{vd}^{(k)}|^2 |s_d^{(k)}|^2, \quad (13)$$

which may be limited by the spectral mask $p_{mask\,v}^{(k)}$ by requiring $$p_{tx\,v}^{(k)} \leq p_{mask\,v}^{(k)} \quad (14)$$

for all subcarriers k=1, ..., K and all lines v=1, ..., L.

In addition or as an alternative, the transmit power may be limited by a per-line sum power $p_{sum\,v}$ by requiring $$\sum_{k=1}^{K} p_{txv}^{(k)} \leq p_{sum\,v} \quad (15)$$

for all lines v=1, ..., L.

The transmit power optimization may then be reformulated in terms of an input power vector which meets the condition:

$$\chi_i^{(k)} |s_i^{(k)}|^2 \Rightarrow s_i^{(k)} = \sqrt{\chi_d^{(k)}} \quad (16)$$

For optimized performance, the data rates, or equivalently the number of bits per symbol b, may be maximized. The number of transmitted bits on line i and subcarrier (k) may be expressed as $$b_i^{(k)} = \log_2\left(1 + \frac{SNR_i^{(k)}}{\Gamma}\right), \quad (17)$$

with an SNR gap $\Gamma$ which is used to reach a specific bit-error rate. For example an SNR gap of $\Gamma$=9.8 dB for a bit error rate of $10^{-7}$ may be used for DSL systems with Reed-Solomon and Trellis coding.

The background noise n may be assumed to have a variance $\sigma^2$, and the transmit signal u may be assumed to have an average power of 1. Accordingly, the sum over all bit loadings according to Eq. (17) can be written as $$R_{sum} = \sum_{v=1}^{L} \sum_{k=1}^{K} \log_2\left(1 + \frac{\chi_v^{(k)}}{\Gamma |g_v^{(k)}|^2 \sigma^2}\right), \quad (18)$$

where the measured SNR is equivalent to $$SNR_i^{(k)} = \frac{\chi_v^{(k)}}{|g_v^{(k)}|^2 \sigma^2}$$

and $|g_v^{(k)}|^2$ is the equalizer coefficient corresponding to line v and subcarrier (k) which brings the receive signal to unit power. Optimization of sum rate gives an optimization problem which may be expressed as:

$$\max \sum_{i=1}^{L} \sum_{k=1}^{K} \log_2\left(1 + \frac{\chi_i^{(k)}}{|g_i^{(k)}|^2 \Gamma \sigma_i^2}\right) \quad (19)$$

$$\text{s.t.} \sum_{d=1}^{L} |p_{vd}^{(k)}|^2 \chi_d^{(k)} \leq p_{mask\,v}^{(k)} \; \forall\, v = 1, \ldots, L, k = 1, \ldots, K$$

$$\text{s.t.} \; \chi_d^{(k)} \leq p_{b\,max\,v}^{(k)} \; \forall\, v = 1, \ldots, L, k = 1, \ldots, K$$

$$\text{s.t.} \sum_{k=1}^{K} \sum_{d=1}^{L} |p_{vd}^{(k)}|^2 \chi_d^{(k)} \leq p_{sum\,v}^{(k)} \; \forall\, v = 1, \ldots, L$$

$$\text{s.t.} \; \chi_d^{(k)} \geq 0 \; \forall\, v = 1, \ldots, L, k = 1, \ldots, K$$

This optimization problem can be solved by a gradient method with an inner and an outer gradient.

The inner gradient updates the values of $\chi^{(k)}$ for each carrier. It may be performed in time steps with a step size $\alpha$ given by $$\chi_{tmpl}^{(k)[t]} = \chi_l^{(k)[t-1]} + \alpha\left(\frac{1}{\chi_l^{(k)[t-1]} + \frac{\Gamma}{SNR_l^{(k)}}} - \sum_{v=1}^{L} \varphi_v |p_{vl}^{(k)}|^2\right) \quad (20)$$

for each time step t. The vector $\phi$ contains one temporary value per line which is used to satisfy the sum-power constraint. It is calculated during initialization and updated, as will be further explained below.

After the update, the temporary power allocation may violate the spectral mask constraints. The constraints may be collected in the linear inequalities $$A^{(k)}\chi^{(k)} \le b^{(k)} \quad (21)$$

$$\chi^{(k)} \ge 0, \quad (22)$$

where the matrix A is defined as $$A = \begin{pmatrix} |p_{11}|^2 & \cdots & |p_{1L}|^2 \\ \vdots & & \vdots \\ |p_{L1}|^2 & \cdots & |p_{LL}|^2 \\ & I_{L \times L} & \end{pmatrix} \quad (23)$$

and the vector b is defined as $$b = [p_{mask\,1}, \ldots, p_{mask\,L}, p_{b\,max\,1}, \ldots, P_{b\,max\,L}]^T \quad (24)$$

With this constraint set, the fact that bit loading is upper bounded by a maximum bit loading $b_{max}$ may also be considered by limiting the transmit power to a value of $$p_{b\,max\,v} = (2^{b_{max}} - 1) \cdot \Gamma \cdot |g_v|^2 \sigma_v^2.$$

Using this notation, the indices of violated constraints $\mu \in 1, \ldots, 2L$ are identified. For each of them, a projection into the constraint set is done according to $$\chi^{(k)[t+1]} = \chi_{imp}^{(k)[t+1]} + a_v^{(k)T} \cdot (a_v^{(k)T} a_v^{(k)})^{-1} (b_v^{(k)} - [A^{(k)} \chi_{imp}^{(k)[t]}]_v), \quad (25)$$

where $a_v^{(k)T}$ is the v-th row of the constraint set matrix A.

Besides the per-subcarrier computations, the per-line sum-power constraint may also exist. This requires a common computation for all subcarriers. This may be done by using a common coupling value $\phi_i$ per line.

The coupling value $\phi_i$ may also be updated using a gradient step and a projection step. The gradient of the outer optimization problem may be represented by $$\frac{\partial \Theta}{\partial \varphi_v} = \sum_{k=1}^{K} \sum_{d=1}^{L} |p_{vd}^{(k)}|^2 \chi_d^{(k)} - p_{sum\,v}. \quad (26)$$

The resulting update rule of the dual problem may be expressed as $$\varphi_v^{[t+1]} = \varphi_v^{[t]} + \alpha \frac{\partial \Theta}{\partial \varphi_v}, \quad (27)$$

with the step size $\alpha$.

Lagrange multipliers for the sum-power constraints are limited to the set of positive numbers. A projection step, which may be performed according to $$\phi_{project\,v} = \max(\phi_v, 0), \quad (28)$$

may be used to satisfy this condition.

Figure 5:
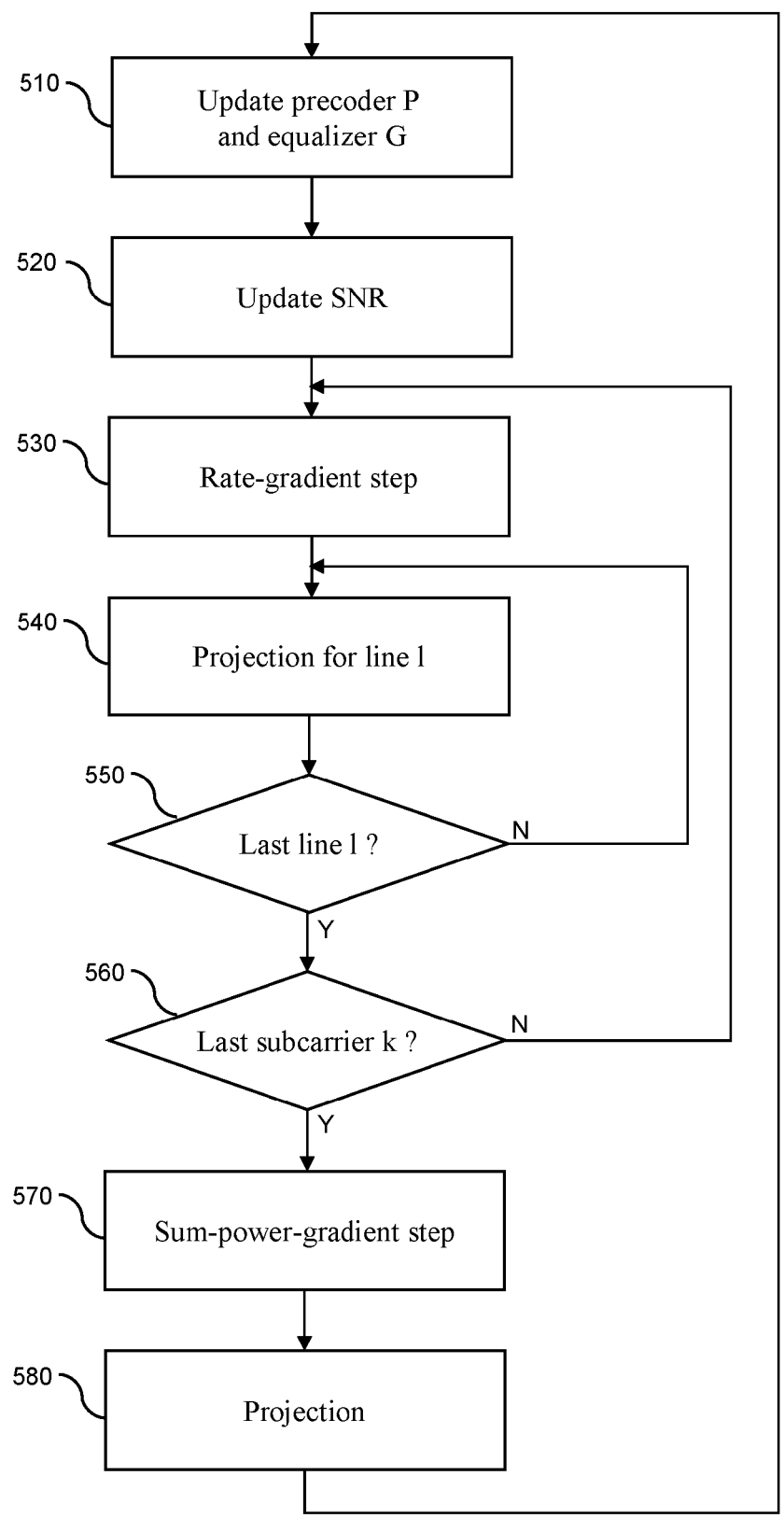
FIG. 5 shows a flowchart for illustrating a method of updating power allocation according to an embodiment.

FIG. 5 shows a flowchart for illustrating a method of updating power allocation based on the above principles.

At 510, the precoder matrix P and the equalizer matrix G are updated.

At 520, the SNR is updated, e.g., by monitoring on symbols transmitted using the base configuration and calculations with respect to other configurations.

At 530, a rate-gradient step is performed, e.g., as explained in connection with Eq. (20).

At 540, a constraint set is calculated, e.g., as explained in connection with Eq. (21), (22), (23), and (24).

At 550, a projection is performed for the presently considered line and subcarrier, e.g., as explained in connection with Eq. (25).

At 560, it is checked if the presently considered line (with index 1) is the last line to be considered, i.e., whether all lines have been considered. If this is not the case, the method returns to 550 to consider a further line, as indicated by branch "N". If the check of 560 shows that the last line was considered, the method continues with 570, as indicated by branch "Y".

At 570, it is checked if the presently considered subcarrier (with index k) is the last subcarrier to be considered, i.e., whether all subcarriers have been considered. If this is not the case, the method returns to 530 to consider a further subcarrier, as indicated by branch "N". If the check of 570 shows that the last line was considered, the method continues with 580, as indicated by branch "Y".

At 580, a sum-power gradient step is performed, e.g., as explained in connection with Eq. (26) and (27).

At 590, a projection to meet sum-power constraints is performed, e.g., as explained in connection with Eq. (28).

After 590, the method may return to 510 for a further iteration of the update process.

In some cases, the bit loading $b_v^{(k)}$ for the downstream direction may be determined at the CPE side. For the base configuration this may be accomplished on the basis of information as typically available at the CPE side. However, for other discontinuous operation configurations the CPE may need further information to determine a stable bit loading.

During initialization, information exchange between the DP and the CPE to determine the bit loading for different configurations may be implemented as follows: 1. The DP determines initial gain values for the base configuration. 2. The CPE measures SNR for this configuration and determines the bit loading. 3. The bit loading is communicated from the CPE to the DP. 4. Based on this information, the DP recomputes gain values for the base configuration. 5. Further, the DP computes the gain difference between the base configuration and other configurations, in particular discontinuous operation configurations.

According to one option, the difference in bit loading may be calculated by the DP, and the required bit loading difference for the discontinuous operation configurations may be communicated to the CPE.

According to a further option, the DP may calculate only the expected SNR difference, communicate the expected SNR difference to the CPE, and let the CPE compute the bit loading for the discontinuous operation configurations. The CPE may then communicate the bit loading for the discontinuous operation configurations to the DP.

When the gain values are updated, the bits and gains changes may be computed at the DP. In case that the CPE requires to change the bit loading for the new gain values, the new values may be communicated to the DP.

Figure 6:
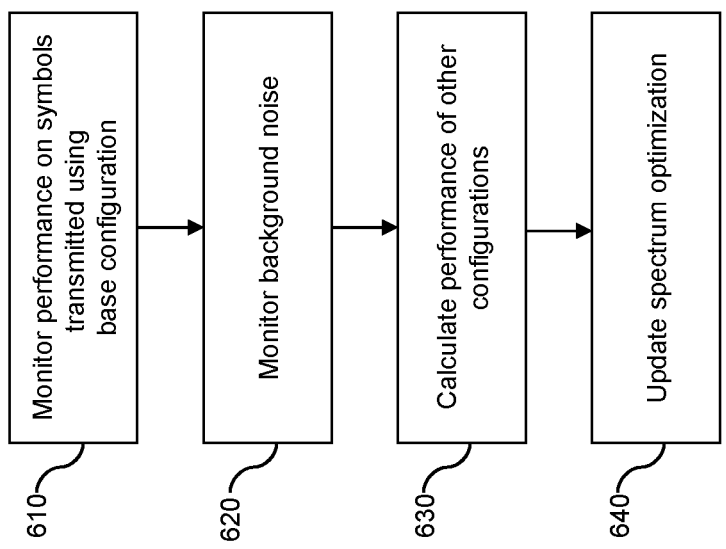
FIG. 6 shows a flowchart illustrating a method of performance monitoring according to an embodiment.

FIG. 6 shows a flowchart illustrating a method according to embodiments, which may be utilized to implement concepts as explained above. The method may be applied for monitoring performance in a data transmission system, e.g., including a DP and a group of CPEs connected to the DP by a bundle of lines, such as illustrated in FIG. 1. The lines may for example each correspond to a pair of copper lines. The data transmission system may for example be based on a Vectoring DSL technology, such as G.fast.

In the method, at least some of the lines of the data transmission system are assumed to be configured for discontinuous operation. The method of monitoring performance is performed with respect to these lines which are configured for discontinuous operation. In some scenarios, the data transmission system may also include further lines. For example, some of the lines of the data transmission system may be configured for discontinuous operation, while one or more further lines of the data transmission system are not configured for discontinuous operation. For example, the latter lines may be configured in a deep low power mode.

While the method of FIG. 6 is described as a series of acts or events, the order in which such acts or events are described is not to be construed as limiting. Instead, in other embodiments the acts or events may be performed in a different order, and/or some of the acts or events may be performed in parallel, for example by different devices in a system or by different parts of a circuit. The method of FIG. 6 may for example be implemented by an apparatus of a data transmission system, e.g., by the provider equipment 10 of FIG. 1, which may correspond to a DP of an FTTdp system.

At 610, performance is monitored on a base configuration. In the base configuration the lines configured for discontinuous operation are active. In other configurations, one or more of the lines are discontinued. Here, a line may be defined as being active when it is actually utilized for transmission of a data symbol. A line may be defined as being discontinued when it is temporarily not utilized for transmission of data symbols or if corresponding transceivers are temporarily switched off. Typically, not all symbols transmitted on the lines are transmitted using the base configuration, but at least some of the transmitted symbols are transmitted using other configurations, e.g., discontinuous operation configurations in which some of the lines are discontinued. Accordingly, only a subset of the symbols transmitted on the lines may be taken into consideration when monitoring the performance.

In some scenarios, the base configuration may include all lines of the data transmission system, except those which are in the deep low power mode. A line in a deep low power mode may be defined as being utilized exclusively for transmission of synchronization symbols and RMC symbols.

The monitoring of the performance may involve averaging over multiple symbols transmitted using the base configuration. These symbols may be arranged at certain positions in a frame or superframe, and do not need to be arranged in a continuous sequence. Information concerning the positions of such symbols may be communicated in the data transmission system, e.g., by providing a corresponding protocol. For example, in a downstream transmission scenario in which measurements for monitoring the performance are performed by a CPE, such information may be communicated to the CPE, e.g., from a DP.

In some scenarios, more symbols may be transmitted using the base configuration, e.g., more symbols than actually required for transmission of data. Such increase of the symbols transmitted using the base configuration may be triggered by a protocol provided by the data transmission system. Increasing the number of symbols transmitted using the base configuration may be utilized for increasing precision of the monitored performance.

The monitored performance may be defined in terms of a SNR. However, in addition or as an alternative the performance could also be monitored on the basis of other measures or link characteristics, such as BER.

At 620, background noise may be monitored. The monitoring of background noise may be performed on a configuration in which all lines configured for discontinuous operation are discontinued. The monitored background noise may be utilized for increasing precision of the monitored performance.

At 630, performance of other configurations, in which at least one of the lines is discontinued, is calculated on the basis of the performance monitored on the symbols transmitted using the base configuration. Such other configurations may differ from the base configuration not only with respect to the lines which are active, i.e., include one or more lines which are discontinued, but may also differ from the base configuration with respect to at least one of a precoder setting and an equalizer setting.

In some scenarios, the data transmission system may also provide a protocol to measure performance for a configuration different from the base configuration by communicating corresponding symbol positions in a frame, e.g., in a TDD frame or superframe, to a receiver, e.g., a CPE, of the data transmission system. The symbol positions may for example be communicated in terms of symbol indices.

At 640, spectrum optimization may be updated. This may be accomplished using the monitored performance, e.g., for performing power optimization. An example of a corresponding optimization method is illustrated by the flowchart of FIG. 6. Further, one or more discontinuous operation configurations may be updated, e.g., with respect to at least one of bit loading and gain values. Also the updating of the discontinuous operation configurations may be accomplished on the basis of the monitored performance.

In some scenarios, the data transmission system may provide a protocol to indicate or at least approximate a position in time of errors within a frame or superframe. The error positions may for example be indicated in terms of symbol indices. The errors may include at least one of FEC errors and CEC errors. The error positions and/or other information concerning the errors may be used as supplemental information for improving precision of the monitored performance.

In some scenarios, bit loading may be selected by a receiver of the data transmission system, e.g., at the CPE side. In such cases, the data transmission system may also provide a protocol for updating bit loading and/or gain values at the receiver.

Figure 7:
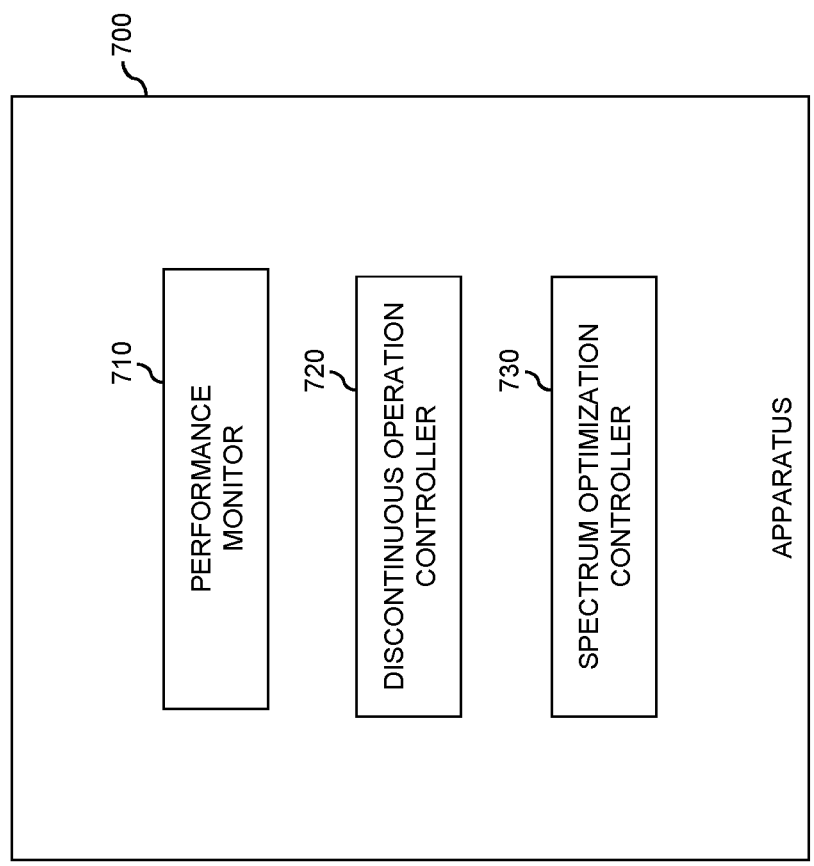
FIG. 7 shows a block diagram for schematically illustrating an apparatus according to an embodiment.

FIG. 7 schematically illustrates an apparatus 700 according to an embodiment. The apparatus 700 of FIG. 7 may for example correspond to the provider equipment 10 of FIG. 1. In particular, the apparatus of FIG. 7 may correspond to a DP of an FTTdp system.

The apparatus 700 may be configured to perform the method as explained in connection with FIG. 6. For this purpose, the apparatus 700 may be provided with a performance monitor 710. The performance monitor 710 may in particular implement the monitoring of the performance on the symbols transmitted using the base configuration as explained in connection with FIG. 6.

As further illustrated, the apparatus 700 may be provided with a discontinuous operation controller 720. The discontinuous operation controller 720 may implement functionalities relating to the utilization of discontinuous operation on certain lines of the data transmission system, e.g., by applying a corresponding configuration with respect to gain values or bit loading. Further, the discontinuous operation controller 720 may also control when and which lines to discontinue and/or to control which lines are configured for discontinuous operation.

As further illustrated, the apparatus 700 may be provided with a spectrum optimization controller 730. The spectrum optimization controller 730 may implement functionalities relating to spectrum optimization based on the monitored performance. This may for example include updating of gain values or bit loading.

The above-described embodiments serve as examples only and are not to be construed as limiting. The above-mentioned methods may be implemented in devices using hardware, software, firmware or combinations thereof, for example in the devices and system illustrated in FIG. 1. For example, to implement methods disclosed herein firmware of conventional devices may be updated to be able to use techniques disclosed herein.

The invention claimed is:

1. A method for performance monitoring in a data transmission system with lines configured for discontinuous operation, the method comprising:
monitoring performance on symbols transmitted using a base configuration in which the lines are active;
monitoring of background noise on symbols transmitted using a configuration in which the lines are all discontinued; and
based on the monitoring of performance on the symbols transmitted using the base configuration, calculating performance for one or more other configurations in which one or more of the lines are discontinued.

2. The method according to claim 1,
wherein the performance is defined in terms of a Signal to Noise Ratio.

3. The method according to claim 1, comprising:
increasing precision of the monitored performance by transmitting more symbols using the base configuration.

4. The method according to claim 1, comprising:
based on the monitoring of performance on the symbols transmitted using the base configuration, calculating performance for one or more other configurations which differ from the base configuration with respect to at least one of a precoder setting and an equalizer setting.

5. The method according to claim 1,
wherein the data transmission system provides a protocol to measure performance for a configuration different from the base configuration by communicating corresponding symbol positions in a frame to a receiver of the data transmission system.

6. The method according to claim 1,
wherein the data transmission system provides a protocol to identify a position in time of errors within a frame.

7. The method according to claim 6,
wherein the errors comprise at least one of Forward Error Correction errors and Cyclic Redundancy Check errors.

8. The method according to claim 1, comprising:
updating spectrum optimization using power optimization and the monitored performance.

9. The method according to claim 1, comprising:
updating of one or more discontinuous operation configurations with respect to at least one of bit loading and gain values.

10. The method according to claim 1,
wherein the data transmission system provides a protocol for updating bit loading and gain values selected by a receiver of the data transmission system.

11. The method according to claim 1,
wherein the data transmission system is based on a Vectoring Digital Subscriber Line technology.

12. An apparatus for a data transmission system with lines configured for discontinuous operation, comprising:
a performance monitor configured to:
monitor performance in a base configuration in which the lines are active;
monitor background noise on symbols transmitted using a configuration in which the lines are all discontinued; and
based on the monitoring of performance on the symbols transmitted using the base configuration, calculate performance for one or more other configurations in which one or more of the lines are discontinued.

13. The apparatus according to claim 12,
wherein the performance is defined in terms of a Signal to Noise Ratio.

14. The apparatus according to claim 12,
wherein the performance monitor is configured to increase precision of the monitored performance by transmitting more symbols using the base configuration.

15. The apparatus according to claim 12,
wherein the performance monitor is configured to, based on the monitoring of performance on the symbols transmitted using the base configuration, calculate performance for one or more other configurations which differ from the base configuration with respect to the lines which are active and/or with respect to at least one of a precoder setting and an equalizer setting.

16. The apparatus according to claim 12,
wherein the data transmission system provides a protocol to measure performance for a configuration different from the base configuration by communicating corresponding symbol positions in a frame to a receiver of the data transmission system.

17. The apparatus according to claim 12,
wherein the data transmission system provides a protocol to identify a position in time of errors within a frame.

18. The apparatus according to claim 17,
wherein the errors comprise at least one of Forward Error Correction errors and Cyclic Redundancy Check errors.

19. The apparatus according to claim 12,
wherein the apparatus is configured to update spectrum optimization using power optimization and the monitored performance.

20. The apparatus according to claim 12,
wherein the apparatus is configured to update of one or more discontinuous operation configurations with respect to at least one of bit loading and gain values.

21. The apparatus according to claim 12,
wherein the data transmission system provides a protocol for updating bit loading and gain values selected by a receiver of the data transmission system.

22. The apparatus according to claim 12,
wherein the data transmission system is based on a Vectoring Digital Subscriber Line technology.

* * * * *